US011157073B2

(12) United States Patent
Zhang

(10) Patent No.: US 11,157,073 B2
(45) Date of Patent: Oct. 26, 2021

(54) GAZE CALIBRATION FOR EYE-MOUNTED DISPLAYS

(71) Applicant: Spy Eye, LLC, Los Gatos, CA (US)

(72) Inventor: Hansong Zhang, Los Altos, CA (US)

(73) Assignee: Tectus Corporation, Saratoga, CA (US)

( * ) Notice: Subject to any disclaimer, the term of this patent is extended or adjusted under 35 U.S.C. 154(b) by 212 days.

(21) Appl. No.: 15/725,059

(22) Filed: Oct. 4, 2017

(65) Prior Publication Data

US 2019/0101979 A1 Apr. 4, 2019

(51) Int. Cl.
*G06F 3/01* (2006.01)
*G09G 5/38* (2006.01)
*G02B 27/01* (2006.01)
*G06F 3/147* (2006.01)

(52) U.S. Cl.
CPC ......... *G06F 3/013* (2013.01); *G02B 27/0172* (2013.01); *G02B 27/0179* (2013.01); *G06F 3/147* (2013.01); *G09G 5/38* (2013.01); *G02B 2027/014* (2013.01); *G02B 2027/0147* (2013.01); *G02B 2027/0187* (2013.01); *G06F 3/012* (2013.01); *G09G 2320/0693* (2013.01); *G09G 2320/08* (2013.01); *G09G 2340/0407* (2013.01); *G09G 2340/0492* (2013.01); *G09G 2354/00* (2013.01)

(58) Field of Classification Search
CPC ............ G09G 2320/0693; G06F 3/013; G02B 27/0179; G02B 2027/0187; G02B 27/0093; G02C 7/083; G02C 7/085
See application file for complete search history.

(56) References Cited

U.S. PATENT DOCUMENTS

| 6,851,805 B2 | 2/2005 | Blum et al. | |
|---|---|---|---|
| 8,971,978 B2 | 3/2015 | Ho et al. | |
| 9,442,310 B2 | 9/2016 | Biederman et al. | |
| 9,939,658 B1 | 4/2018 | Gutierrez et al. | |
| 2009/0189830 A1* | 7/2009 | Deering | G09G 3/02 345/1.3 |
| 2009/0189974 A1* | 7/2009 | Deering | G02B 27/017 348/46 |
| 2009/0196460 A1* | 8/2009 | Jakobs | G06F 3/013 382/103 |
| 2010/0205667 A1* | 8/2010 | Anderson | G06F 3/013 726/19 |
| 2013/0128364 A1* | 5/2013 | Wheeler | A61B 3/113 359/630 |
| 2013/0278631 A1* | 10/2013 | Border | G06F 3/04842 345/633 |

(Continued)

*Primary Examiner* — Mark K Zimmerman
*Assistant Examiner* — Jonathan M Cofino
(74) *Attorney, Agent, or Firm* — Fenwick & West LLP

(57) ABSTRACT

A method for calibrating an orientation of an eye-mounted display relative to a user's gaze, preferably performed by a system. The system causes the eye-mounted display to project a calibration image onto the user's retina. The user provides information about a relative orientation between the user's gaze and the calibration image, for example a translation offset or a relative rotation. Based on the received information, an orientation for the eye-mounted display that aligns with the user's gaze is determined. Images to be projected by the eye-mounted display onto the user's retina can be adjusted based on the determined orientation.

21 Claims, 12 Drawing Sheets

(56) References Cited

U.S. PATENT DOCUMENTS

| | | |
|---|---|---|
| 2014/0098226 A1 | 4/2014 | Pletcher et al. |
| 2014/0282196 A1* | 9/2014 | Zhao ........................ G06F 3/013 715/771 |
| 2015/0049004 A1* | 2/2015 | Deering ............. G02B 27/0093 345/8 |
| 2015/0301338 A1* | 10/2015 | Van Heugten ........... G02C 7/04 345/8 |
| 2015/0302585 A1* | 10/2015 | VanBlon ................. G06F 3/041 345/173 |
| 2015/0312560 A1* | 10/2015 | Deering ................ A61F 2/1602 345/1.3 |
| 2015/0362750 A1 | 12/2015 | Yeager et al. |
| 2016/0097940 A1 | 4/2016 | Sako et al. |
| 2016/0147301 A1* | 5/2016 | Iwasaki .................. G06F 3/013 345/157 |
| 2016/0299354 A1 | 10/2016 | Shtukater |
| 2016/0320837 A1* | 11/2016 | Swedish ................. G06F 3/013 |
| 2017/0023793 A1* | 1/2017 | Shtukater ............. H04N 13/344 |
| 2017/0140507 A1* | 5/2017 | Abuelsaad ............ G06T 3/4092 |
| 2017/0270636 A1* | 9/2017 | Shtukater ................ G06F 3/012 |
| 2017/0371184 A1 | 12/2017 | Shtukater |
| 2017/0371408 A1* | 12/2017 | Wilson ............... A61B 5/02438 |
| 2019/0179165 A1* | 6/2019 | Shtukater ........... G02B 27/0093 |

\* cited by examiner

GAZE CALIBRATION FOR EYE-MOUNTED DISPLAYS

BACKGROUND

1. Technical Field

This disclosure relates generally to eye-mounted displays and, more particularly, to calibration of eye-mounted displays.

2. Description of Related Art

An eye-mounted display has been proposed by Deering. See, e.g. U.S. Pat. No. 8,786,675, "Systems using eye mounted displays." One type of eye-mounted display is based on a tiny projector mounted inside a contact lens. The projector projects images onto the retina of a person wearing the lens. The projector must be very small to fit in the contact lens, so small that Deering called it a "femtoprojector". A typical femtoprojector is no larger than about a millimeter in any dimension.

Eye-mounted displays can be used for virtual reality applications and also for augmented reality applications. In virtual reality applications, the images projected by the eye-mounted display replace what the user would normally see as his external environment. In augmented reality applications, the images projected by the eye-mounted display augment what the user would normally see as his external environment, for example they may appear as overlays on the external environment.

Goggles and other types of head-mounted displays have also been proposed for these types of applications. Although these devices move with the user's head, they do not automatically move with the user's eye. In contrast, eye-mounted displays do automatically move with the user's eye because they are mounted on the user's eye. This has significant advantages. However, it also presents unique challenges. Furthermore, because of this difference, techniques developed for head-mounted displays are not always appropriate or sufficient for eye-mounted displays.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

It may be desirable to calibrate the orientation of an eye-mounted display relative to the user's field of view, for example to ensure that the center of the display is coincident with the center of the user's gaze. Preferably, this can be done by the user without the assistance of others, using a self-calibration process. In one approach, the eye-mounted display projects a calibration image onto the user's retina. The user provides information about the relative orientation between the user's gaze and the calibration image, for example describing the misalignment or describing how to align the center of the calibration image with the center of the user's gaze. This information is used to calibrate the eye-mounted display, aligning it with the user's gaze.

Figure 1:
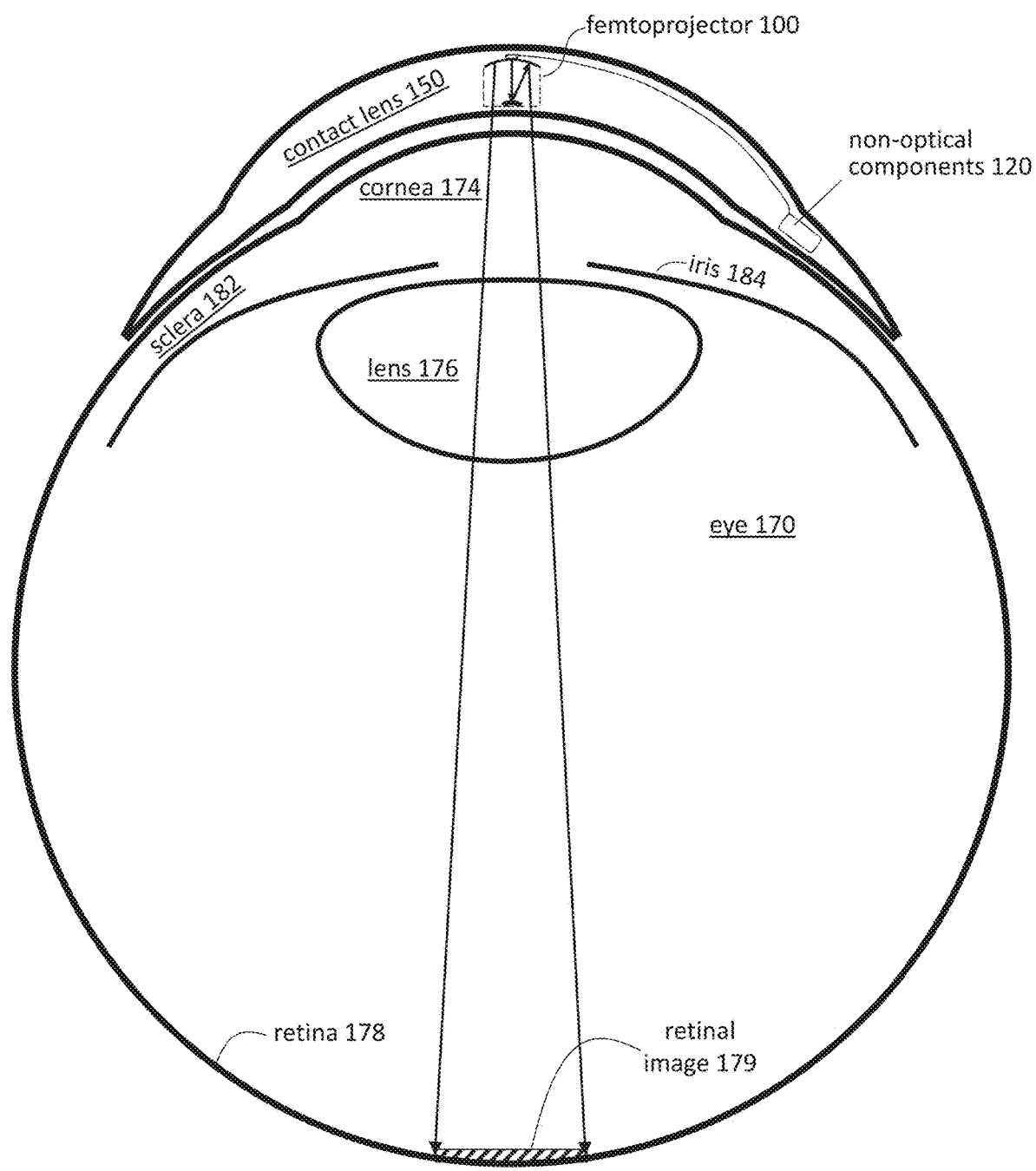
FIG. 1 shows a cross sectional view of an eye-mounted display containing a femtoprojector in a contact lens.

FIG. 1 shows a cross sectional view of an eye-mounted display containing a femtoprojector 100 in a contact lens 150. FIG. 1 shows an embodiment using a scleral contact lens but the contact lens does not have to be scleral. The contact lens 150 is separated from the cornea 174 of the user's eye 170 by a tear layer. Over the cornea 174, the tear layer may be as thick as a hundred microns or more while it may be only a few microns thick over the sclera 182. The aqueous of the eyeball is located between the cornea and the crystalline lens 176 of the eye. The vitreous fills most of the eyeball including the volume between the intraocular lens 176 and the retina 178. The iris 184 limits the aperture of the eye.

The contact lens 150 preferably has a thickness that is less than two mm, and the femtoprojector 100 preferably fits in a 2 mm by 2 mm by 2 mm volume. The contact lens 150 is comfortable to wear and maintains eye health by permitting oxygen to reach the cornea 174.

In the example design of FIG. 1, the optical path from the image source in the femtoprojector 100 to the image 179 on the retina 178 does not include any air gaps, although this is not required. As a result, the femtoprojector 100 embedded in contact lens 150 is insensitive to the air—cornea interface that provides most of the focusing power in an unaided eye. Further, the system is not affected by variations in cornea shape that occur from one person to another.

Figure 2:
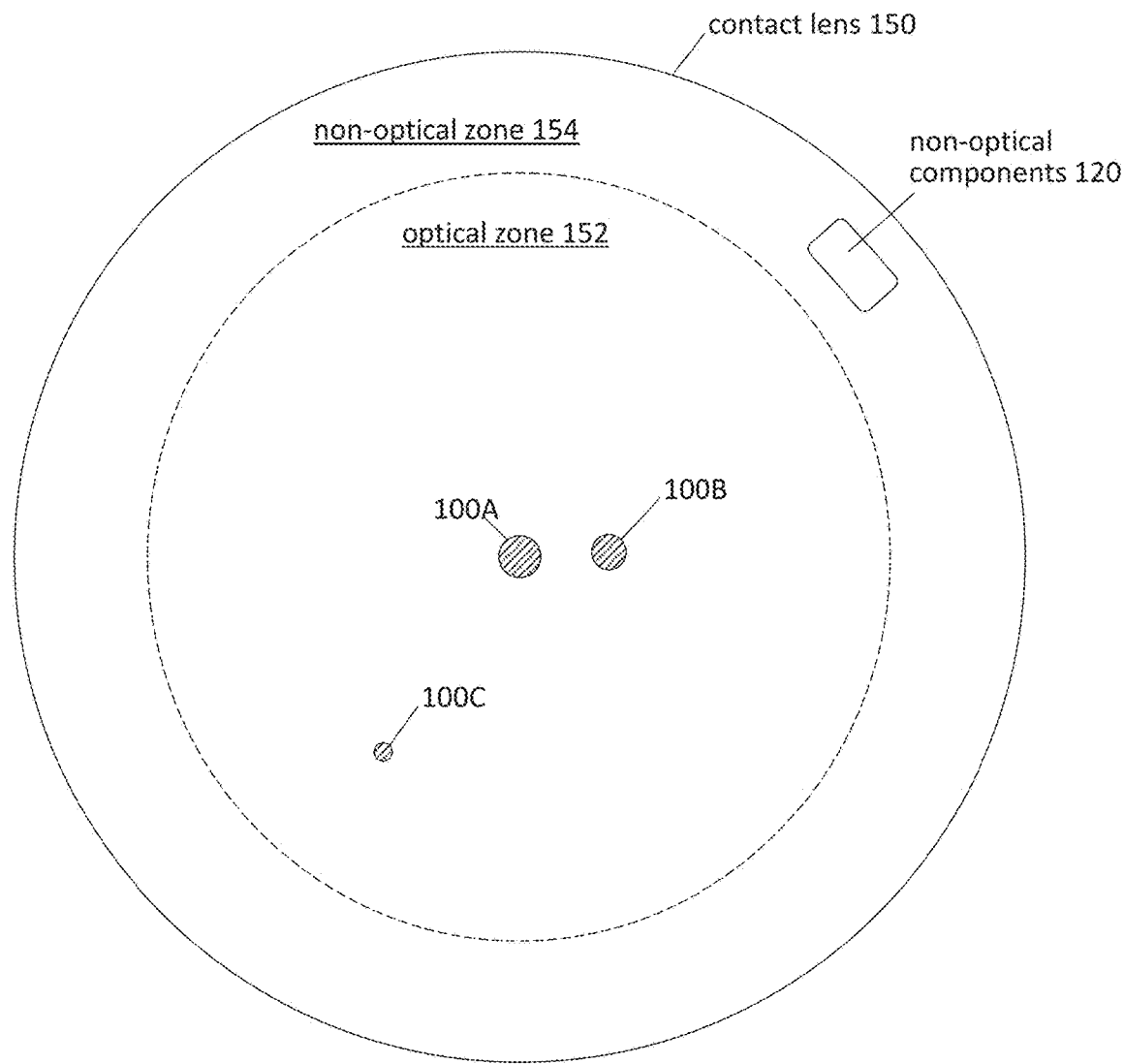
FIG. 2 shows a plan view of an eye-mounted display containing multiple femtoprojectors in a contact lens.

FIG. 2 shows a plan view of an eye-mounted display with multiple femtoprojectors 100A-C in a contact lens 150. This plan view is taken looking at the display from the top of FIG. 1. The ratio of the contact lens diameter to femtoprojector lateral size is roughly 25:1 for the largest femtoprojector. This ratio is normally between about 15:1 and 30:1, but may be as small as 5:1 or as large as 50:1. FIG. 2 shows three femtoprojectors 100A-C in the contact lens, but many femtoprojectors, or only one, may be mounted in such a lens. Eye-mounted displays with as many as 49 femtoprojectors in a contact lens have been proposed. If there is only one femtoprojector in a lens, it need not be in the center of the lens. The femtoprojectors 100 in FIG. 2 are also shown as different sizes, although they could also be the same size.

In FIG. 2, the contact lens 150 is roughly divided by the dashed circle into an optical zone 152 and a non-optical zone 154. Components in the optical zone 152 (such as the femtoprojectors 100) may be in the optical path of the eye, depending on how far open the iris is. Components 120 in the non-optical zone 154 fall outside the aperture of the eye. In addition to the femtoprojectors 100, the contact lens may also contain other components for data transmission, power and/or positioning. Data transmission components may include antennae or optical/infrared photodetectors, data storage and buffering, controls, and possibly also on-lens processing. Power components may include coils for power transmission and batteries for power storage. Positioning components may include accelerometers and fiducial or other structures used for eye tracking and head tracking.

In addition to the eye-mounted display, the overall system may also include a head tracker, eye tracker and scaler. The system receives input images (including possibly video), which are to be displayed to the human user via the eye-mounted display. The femtoprojectors project the images on the user's retina, thus creating an image of virtual objects in the user's field of view. The scaler receives the input images and produces the appropriate data and commands to drive the femtoprojectors. The head tracker and eye tracker provide information about head movement/position and eye movement/position, so that the information provided to the femtoprojectors can be compensated for these factors.

There are many ways in which this functionality can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace or other types of packs.

Eye-mounted displays move with the user's eye so that each pixel in the display is projected to the same location on the user's retina regardless of the position or orientation of the eye. However, when the eye-mounted display is first worn by a user, it may be useful to calibrate the orientation of the display relative to the user's eye 170, as further explained in FIGS. 3A-3C.

Figure 3A:
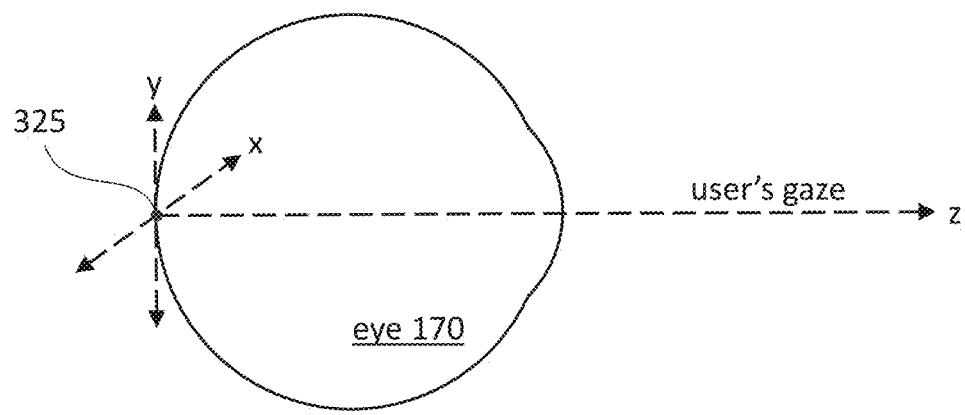
FIG. 3A shows a frame of reference for a user's gaze.

FIG. 3A shows one way to define a frame of reference for a user's perception of the external environment, which will be referred to as his gaze. In this example, the user's gaze is defined by an x-y-z coordinate system, as follows. The z-axis defines the "center" of the user's gaze. When the user is staring at a point in the external environment, the z-axis is defined by what the user perceives as the center of his field of view. This also defines the origin of the x-y surface.

The x- and y-axes are orthogonal axes for the image. The x-axis corresponds to "horizontal" and the y-axis corresponds to "vertical." That is, when a user's head is not tilted, horizontal lines in the external environment will appear in the perceived image as parallel to the x-axis and vertical lines in the external environment will appear in the perceived image as parallel to the y-axis. These axes are drawn as straight lines in FIG. 3A so that the x- and y-axes would define a plane. This is done because the perceived image typically is depicted as planar. In the remaining figures, the x- and y-axes are shown as dashed lines, and the origin of the x-y plane (i.e., the gaze center) is marked by a solid dot 325.

Figure 3B:
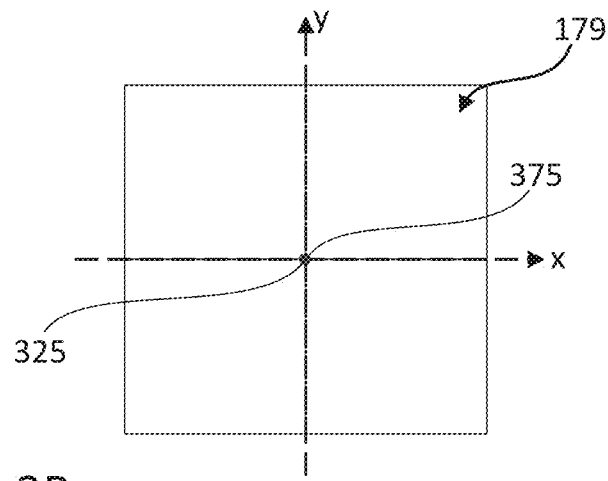
FIGS. 3B and 3C show retinal images produced by an eye-mounted display that is aligned and not aligned, respectively, with the user's gaze.

FIG. 3B shows an image 179 projected by an eye-mounted display onto the retina. The image 179 is overlaid on the x-y axes of the user's gaze. For convenience, the image 179 is shown as a square. The image 179 could be from a single femtoprojector or from multiple femtoprojectors, each of which includes multiple pixels. The individual pixels in the image 179 typically will not be shown. The center 375 of the image and the horizontal and vertical directions within the image are defined by the solid line cross-hairs, which in FIG. 3B are perfectly overlaid on the x-y axes of the user's gaze. In this example, the eye-mounted display is aligned with the user's gaze, meaning that the center pixel of the eye-mounted display (marked by the intersection of the cross-hairs) is projected to a point 375 in the retinal image 179 that is coincident with the center 325 of the user's gaze and that horizontal/vertical lines in the eye-mounted display are projected to lines in the retinal image 179 that are parallel to the x-/y-axis of the user's gaze.

Figure 3C:
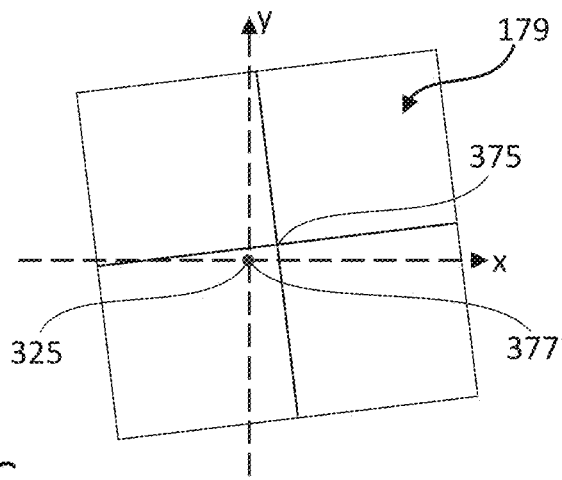

FIG. 3C shows a situation where the eye-mounted display and the user's gaze are misaligned. The center of the eye-mounted display is projected to a point 375 that is offset from the user's gaze center 325. The user's gaze center 325 is actually coincident with point 377 on the image, which corresponds to a pixel not at the physical center of the eye-mounted display. Similarly, the image 179 is also rotated relative to the user's gaze. Calibration can be used to determine an orientation for the eye-mounted display that would align with the user's gaze. Typically, once the amount of misalignment is determined, the eye-mounted display would not be physically translated and rotated to adjust for the misalignment. Rather, the image data for the eye-mounted display would be adjusted accordingly. For example, if an augmented reality image is to be projected by the eye-mounted display, the pixel data for the center of that image (i.e., the part of the image which should be projected to the center of the user's gaze) would be addressed to pixel 377 rather than to pixel 375. Rotation can be similarly accommodated.

Figure 4:
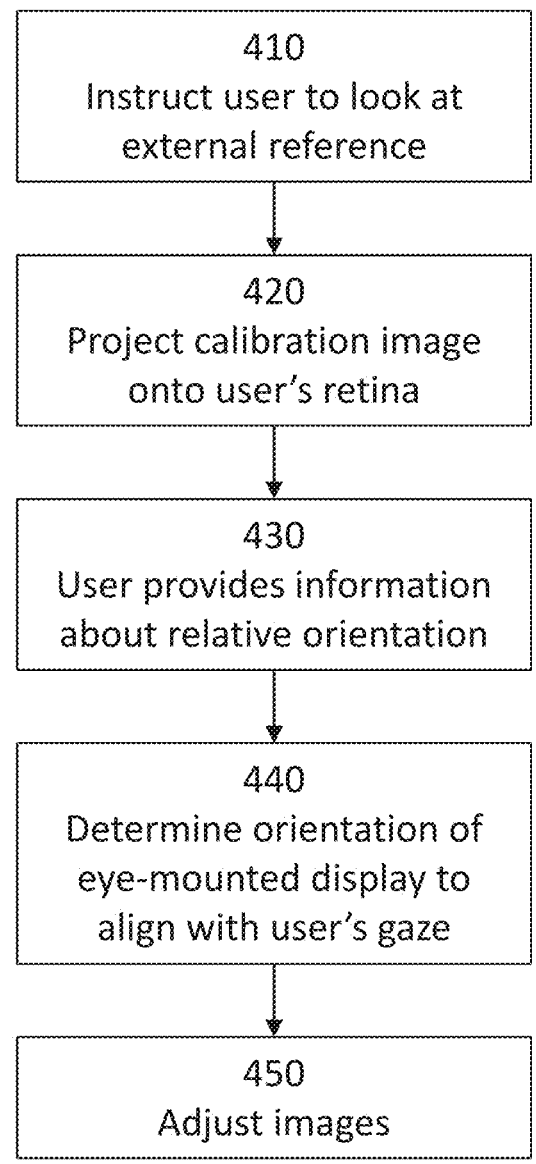
FIG. 4 is a flow diagram of a method for calibrating an orientation of an eye-mounted display relative to a user's gaze.

FIG. 4 is one example of a flow diagram of a method for calibrating an orientation of an eye-mounted display relative to a user's gaze. Optionally, the user is instructed 410 to gaze at an external reference. This helps to anchor the user's gaze and stabilize the frame of reference for the user's gaze. For calibrating mismatch between the eye-mounted display center and user's gaze center, the external reference preferably is a specific point. Examples include the corner of a table, window, door, sheet of paper, box, etc.; a specific letter or symbol in signage, lettering or other graphics; the center of an object; or a distant mountain top, treetop or other distinctive landmark. For calibrating rotational mismatch, the external reference preferably is a specific horizontal/vertical edge. Examples include the horizon; flag poles; and horizontal/vertical edges of buildings, windows, doors, walls, fences, or other structures. While the user is gazing at the external reference, the eye-mounted display projects 420 a calibration image onto the user's retina. The user sees both the external reference and the projected calibration image. Information about the relative orientation between the user's gaze and the calibration image is received 430 from the user. This information is used to determine 440 an orientation for the eye-mounted display that aligns with the user's gaze. As described above, the orientation determined by calibration can then be used to adjust 450 the images projected by the eye-mounted display in order to reduce or eliminate the misalignment between the eye-mounted display and the user's gaze.

Figure 5:
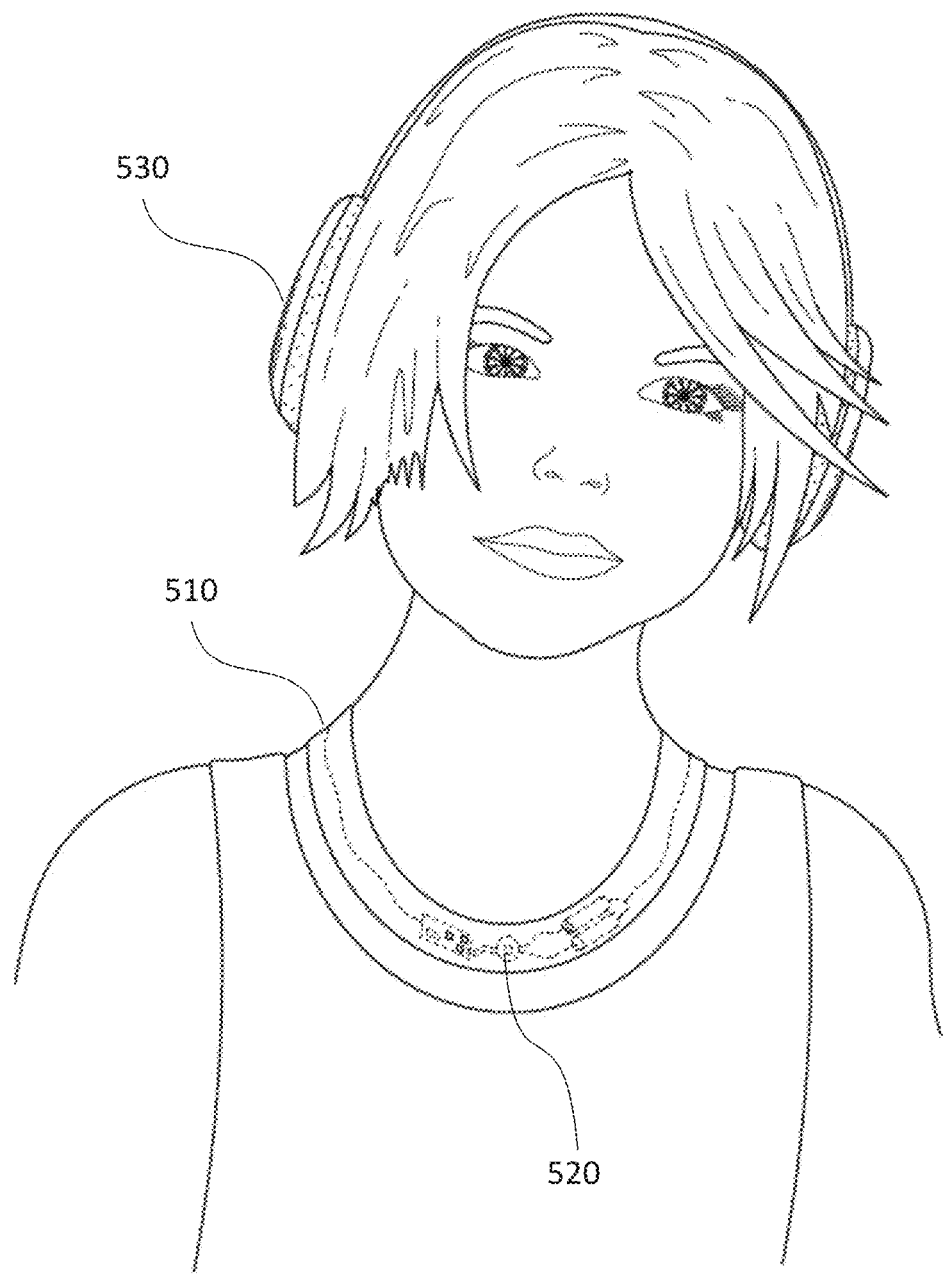
FIG. 5 shows a system that allows a user to self-calibrate.

The calibration preferably is automated so that a user can self-calibrate without the assistance of others. FIG. 5 shows a system suitable for performing such a self-calibration. In FIG. 5, in addition to the eye-mounted display, the user is also wearing a necklace 510 that contains components used to carry out the calibration. In this example, the necklace 510 transmits image data to the eye-mounted display. It also includes a microphone 520 and transmits sound to wireless headphones 530 to communicate with the user. Alternate I/O devices could be used. For example, the eye-mounted display itself or other displays (such as an app on a cell phone) can be used to communicate information to the user. A mouse, touchscreen, keyboard, joystick or other input devices can be used to receive information from the user in non-voice forms.

Figure 6A:
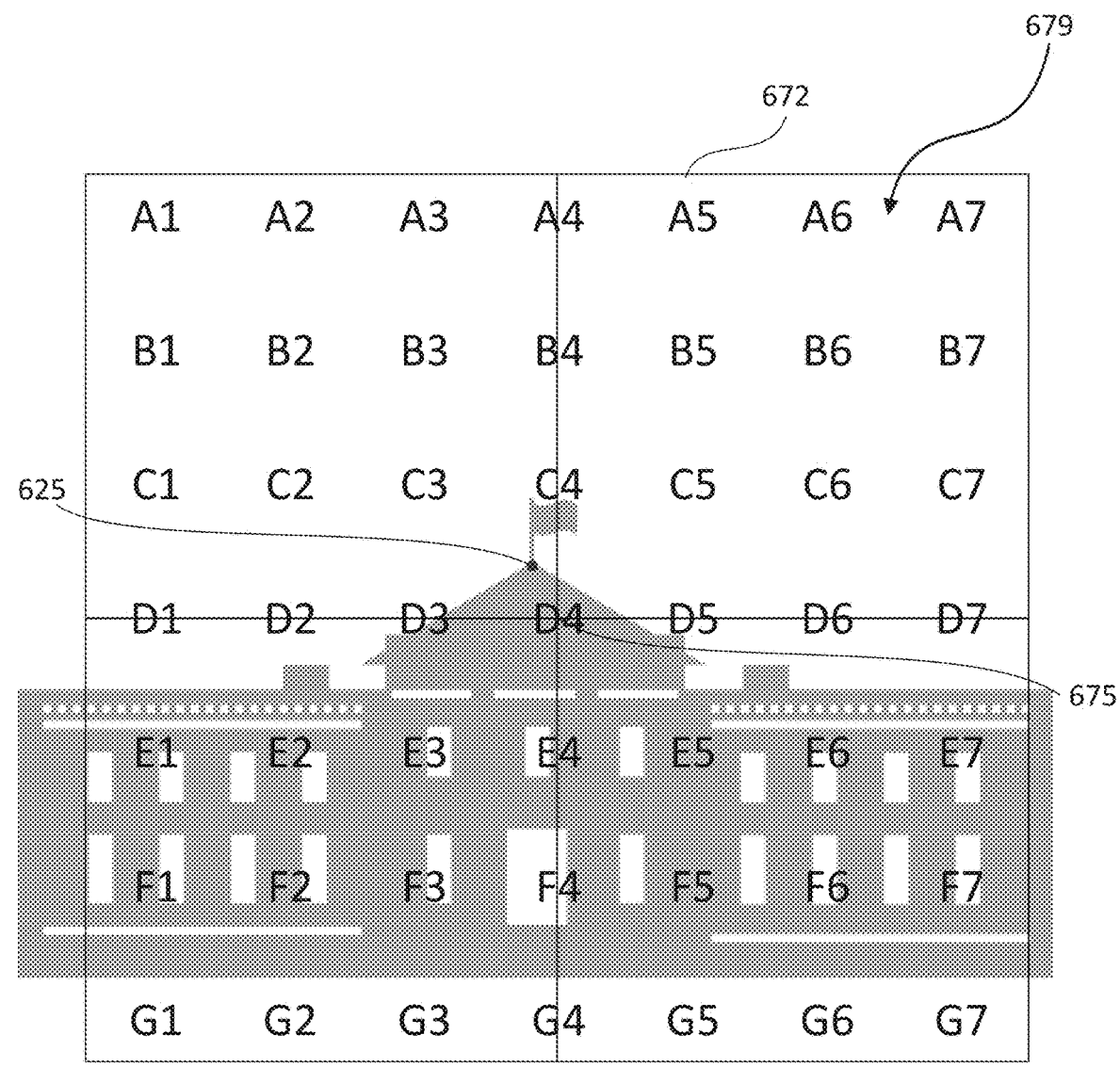
FIG. 6A-6B show an example of center calibration using stationary calibration images of increasing resolution.
Figure 6B:
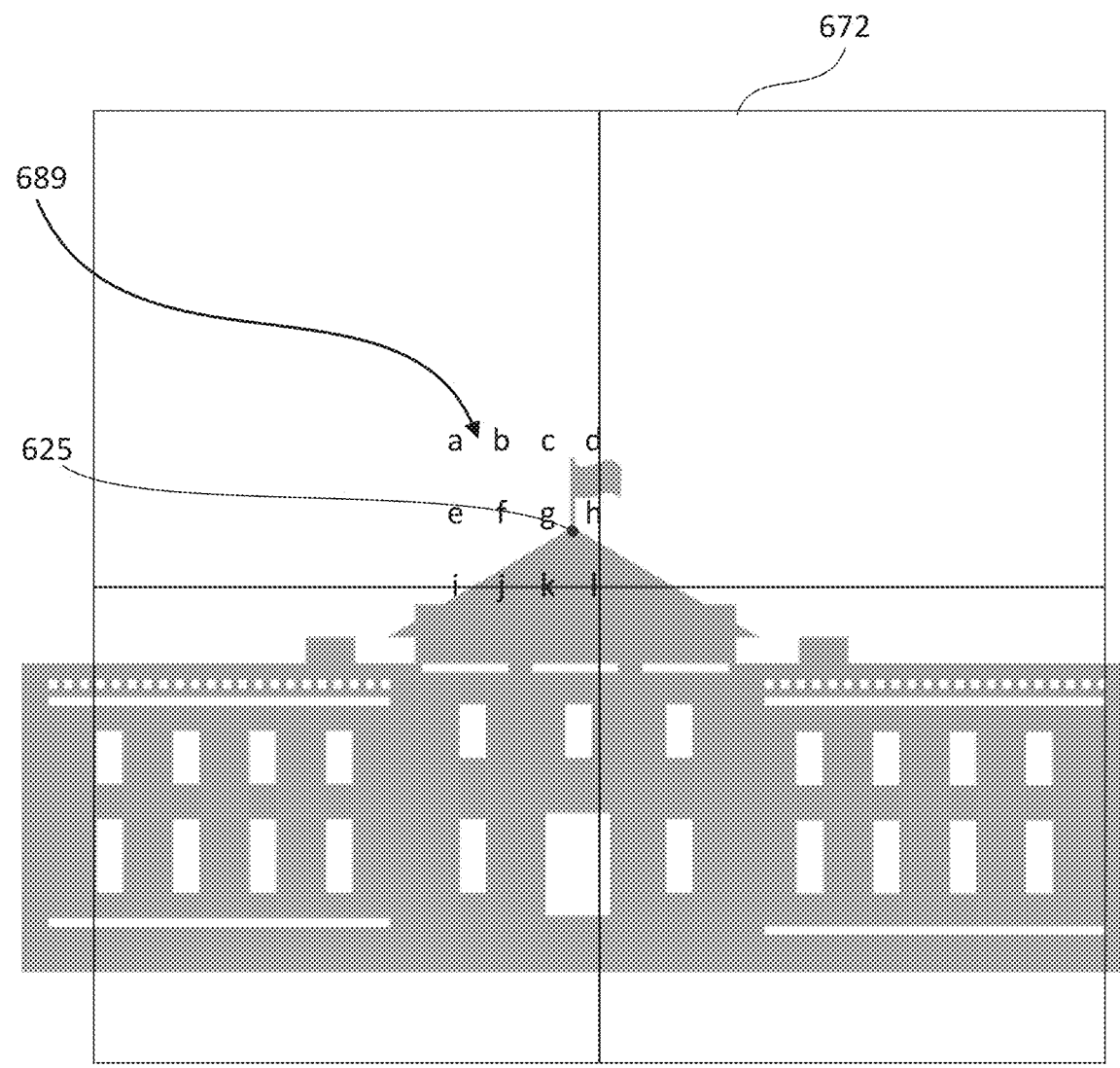

FIG. 6A-6B show an example of center calibration using voice commands and speech recognition. The system uses the speakers 530 to instruct 410 the user, "Now starting gaze calibration. Please select a fixed point in your external environment and look at that point." Here, the user is looking at the White House as shown in FIG. 6A and decides to focus on the peak 625 of the center roof. This serves as an anchor point for the user's gaze, as shown by the center gaze dot 625. For clarity, the dashed x- and y-axes are omitted. The user responds, "OK."

Upon speech recognition of the confirmation, the necklace 510 instructs the eye-mounted display to project 420 a calibration image 679. FIG. 6A shows the calibration image 679 which in this example is a grid of letters and numbers: A1 to G7. The outside square 672 shows the extent of the eye-mounted display and the cross-hairs identify the center 675 of the eye-mounted display, which in this case is also the center D4 of the calibration image. In the user's augmented reality view, the calibration image 679 is overlaid on the White House from the external environment. Note that the center of the calibration image, D4, is offset from the user's gaze center 625.

The system next receives information from the user about a location of the user's gaze center on the calibration image. The system instructs, "Please say the locations closest to your selected point." The user responds 430, "C3, C4, D3, D4." Based on the user's response, the system can calculate the approximate location of the gaze center 625 on the calibration image 679 and this can be used to determine 440 the approximate location on the eye-mounted display that aligns with the user's gaze center 625. In this example, the gaze center 625 is localized to the area defined by the four vertices C3, C4, D3, D4. More complicated instructions can be provided, for example, "Please identify the four locations closest to your selected point, in order from closest to farthest." The user would respond, "D4, C4, D3, C3." This locates the gaze center 625 with better accuracy.

In one approach, finer resolution can be obtained by repeating the process with calibration images of increasing resolution. The coarse calibration image of FIG. 6A is replaced by the finer calibration image 689 of FIG. 6B, centered on the approximate location identified in FIG. 6A. The square border 672 showing the extent of the eye-mounted display is reproduced as a reference. Here, the user responds to the second round calibration with, "g, h, k, l." This localizes the gaze center 625 to an even smaller area.

Figure 7:
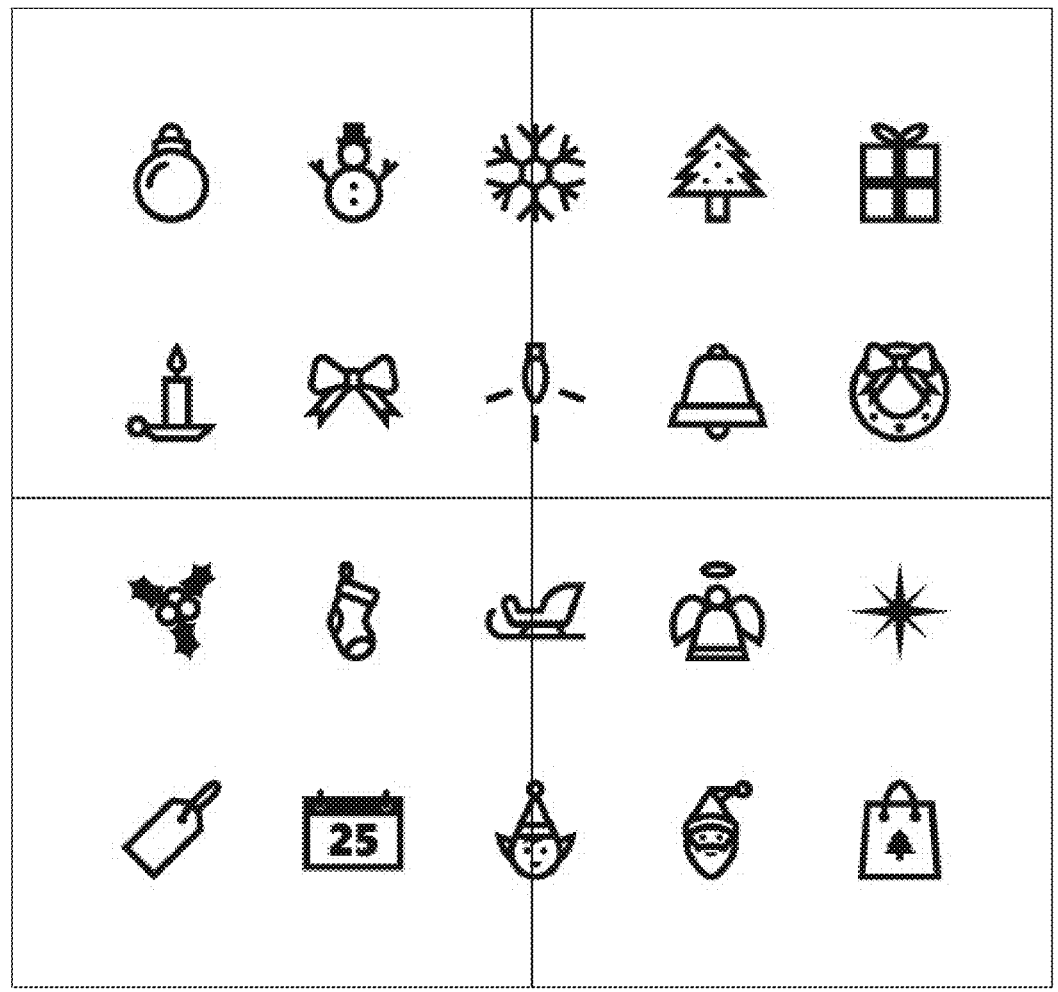
FIG. 7 shows another calibration image using pictures.

Note that other calibration images can be used. FIG. 7 shows an array of recognizable pictures which the user can verbalize: "ornament" "snowman" "snowflake" etc. The calibration image is not required to be an array of symbols. If speech recognition is used, then the calibration image can include any content that allows the user to verbally describe the location of his selected point (i.e., the user's gaze center) relative to the calibration image.

In the examples of FIGS. 6-7, the calibration image is projected to a fixed location, and the user then provides information about the location of the user's gaze center on the stationary calibration image. In an alternate approach, the location of the calibration image is moveable. The user provides information about how to move the calibration image to align the user's gaze center and the calibration image.

Figure 8A:
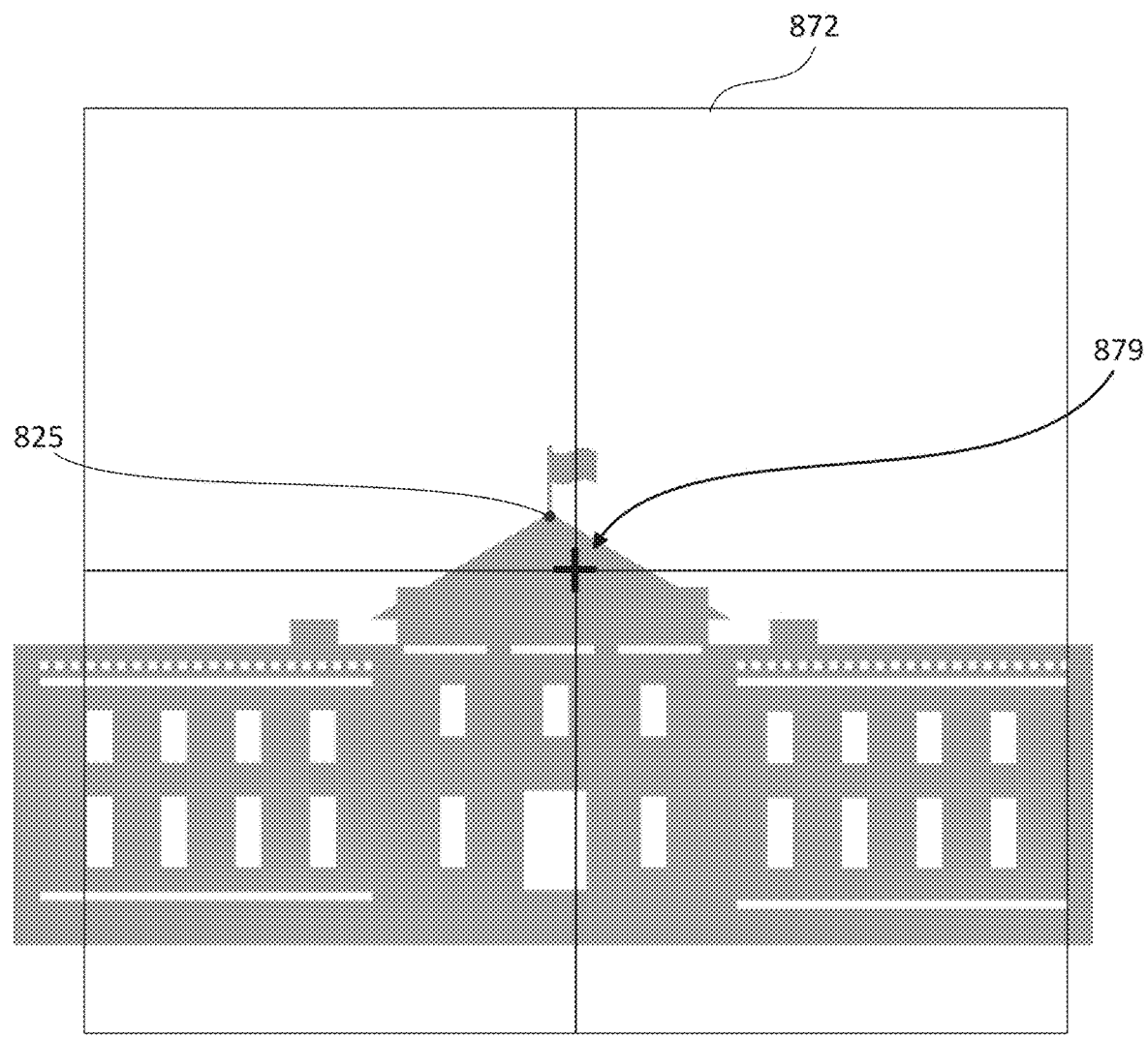
FIG. 8A-8B show an example of center calibration using a moveable calibration image.
Figure 8B:
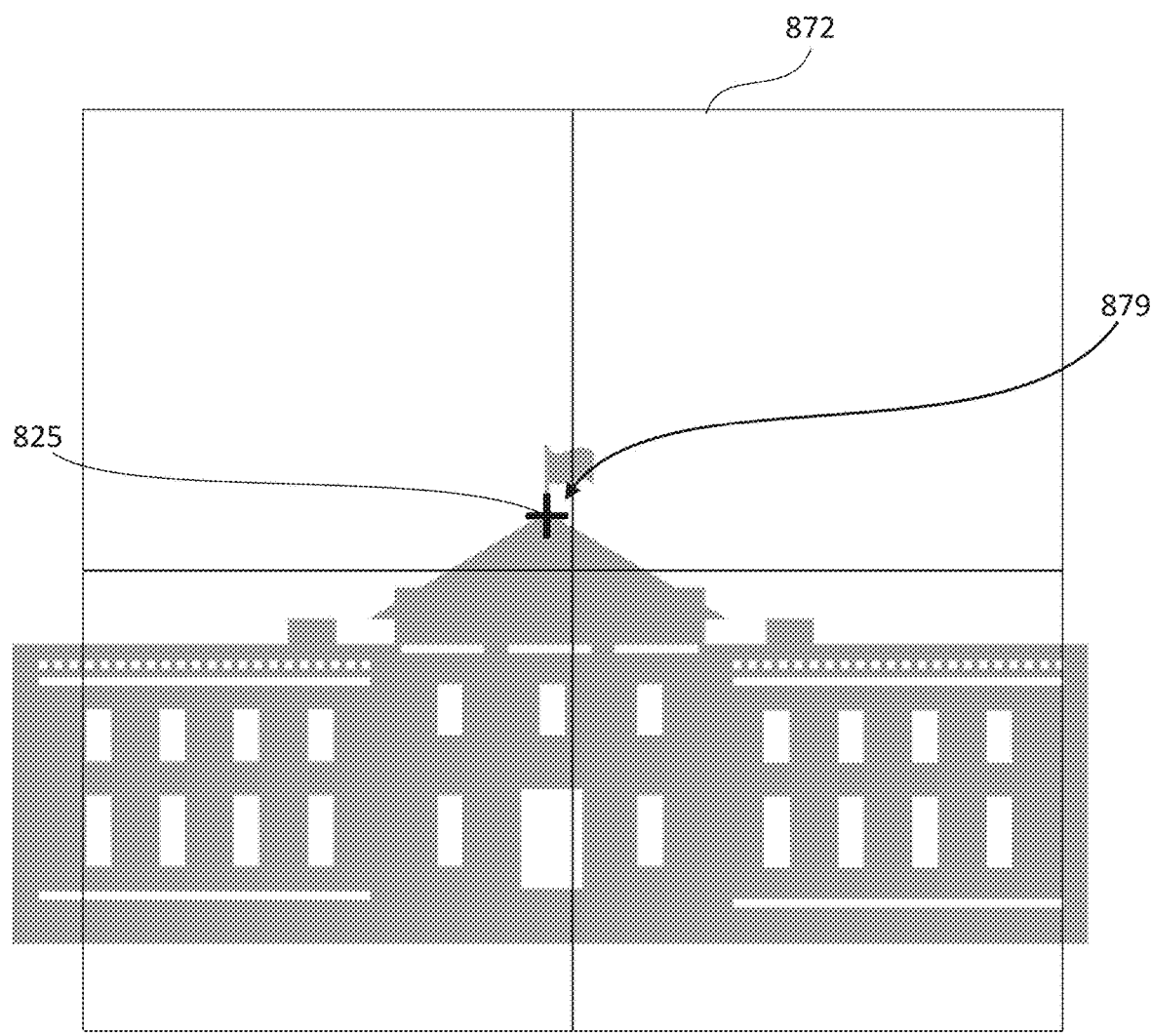

FIGS. 8A-8B provide an example. Here, the calibration image is a cross 879. As before, the large square 872 and cross-hairs show the extent of the eye-mounted display and the center of the eye-mounted display. The cross 879 initially is located at the center of the eye-mounted display. The system instructs the user, "Please move the cross to your selected point" (which is the user's gaze center 825). The user responds by giving instructions, "Left, left, up, up, up, stop." The same information could be provided by the user moving a joystick or hitting arrow buttons on a keyboard or control panel. Based on these instructions, the calibration image 879 is moved to be coincident with the user's gaze center 825, as shown in FIG. 8B. Note that the calibration image 879 is no longer centered on the eye-mounted display. Other types of calibration images with marked centers can be used: X's, bullseye, etc.

Figure 9:
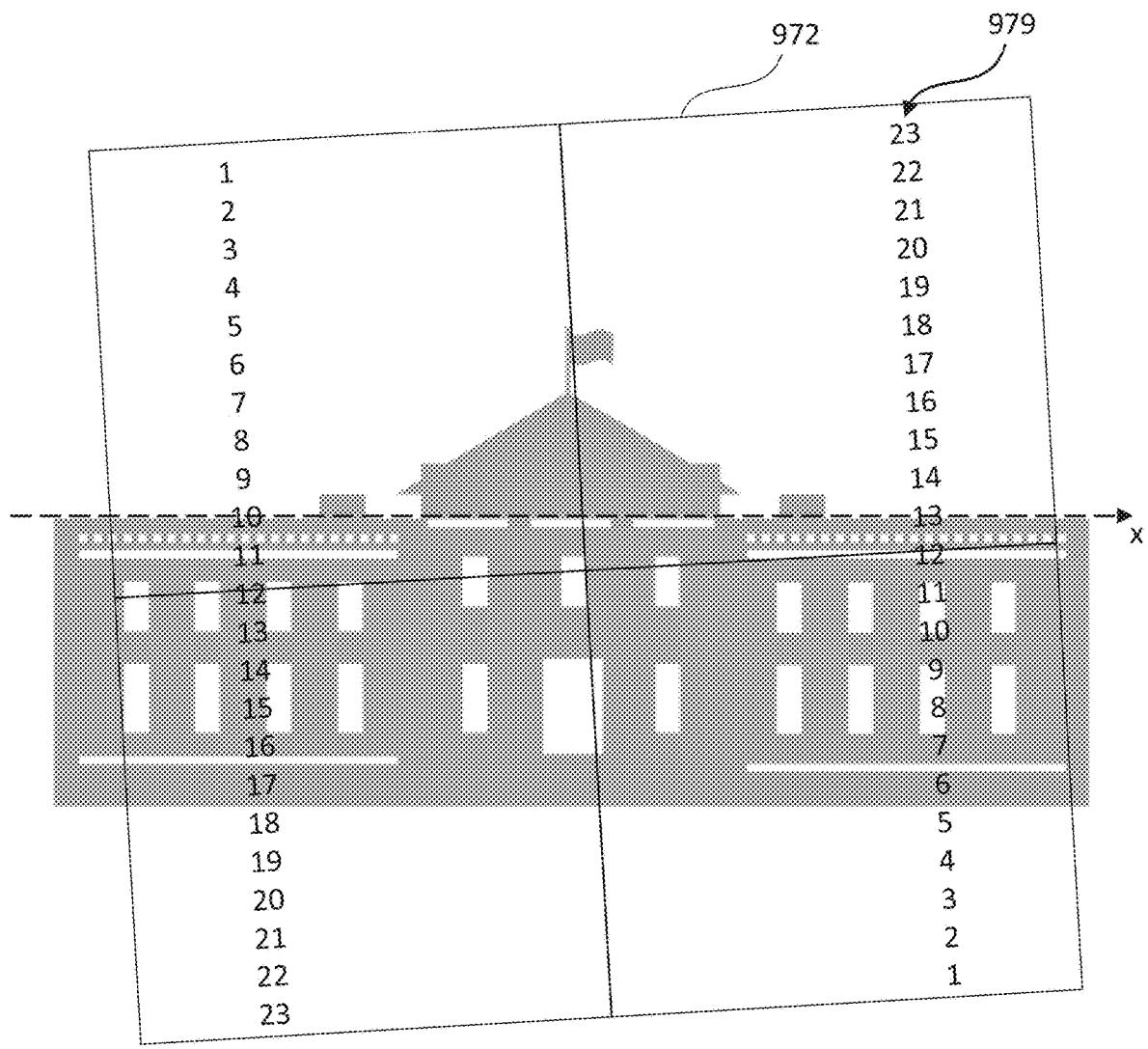
FIG. 9 shows an example of rotation calibration using a stationary calibration image.
Figure 10:
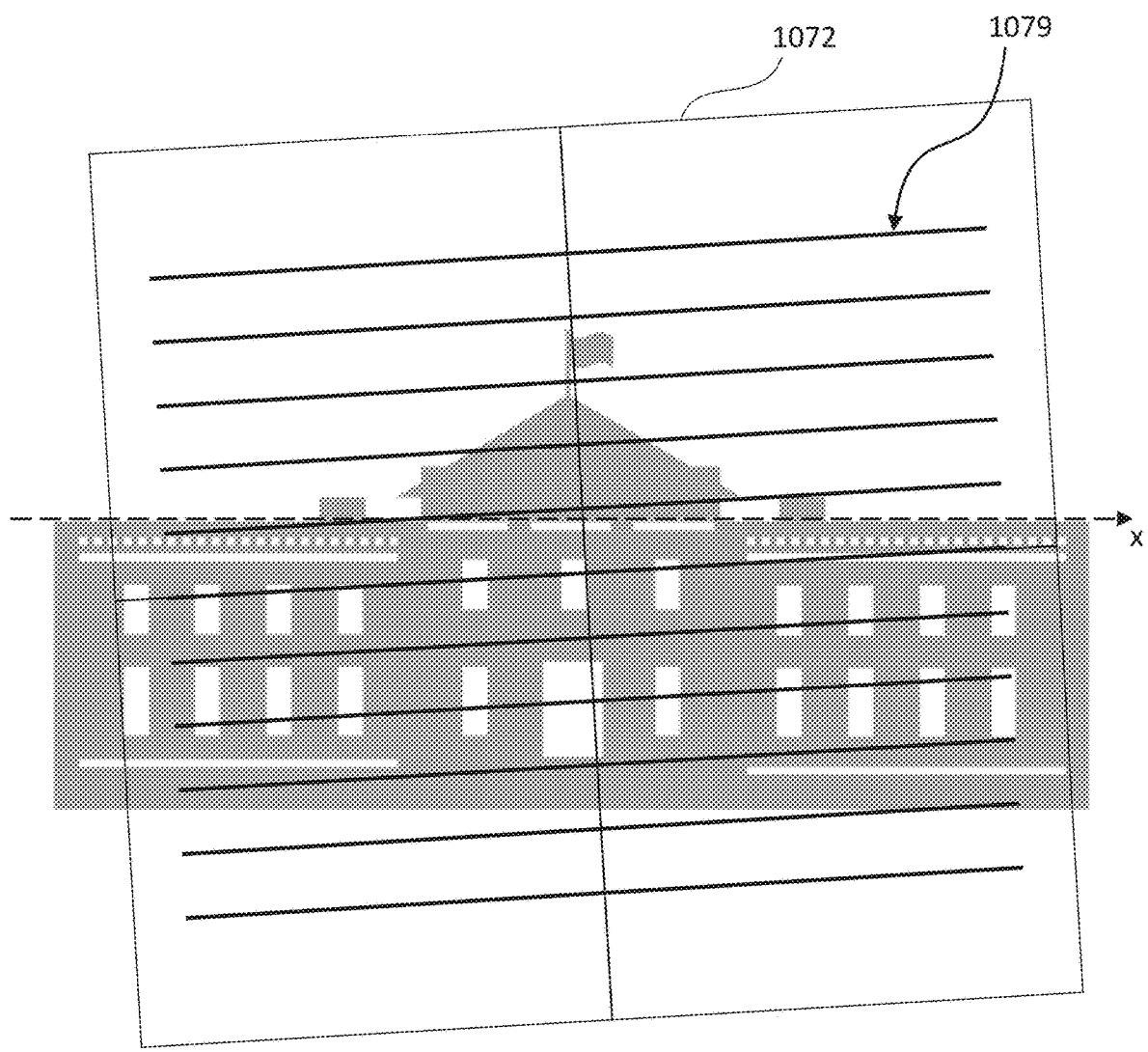
FIG. 10 shows an example of rotation calibration using a moveable calibration image.

FIGS. 9-10 show examples of rotational calibration. FIG. 9 uses a stationary calibration image, and FIG. 10 uses a moveable calibration image. Beginning with FIG. 9, the system instructs 410 the user, "Now starting gaze calibration. Please select a fixed horizontal reference in your external environment and look at that reference." A vertical reference could also be used. In FIG. 9, the user is looking at the horizontal roof line of the White House. This anchors the user's gaze, as shown by the dashed x-axis. The user responds, "OK."

The system instructs the eye-mounted display to project 420 a calibration image 979, which in this example are two columns of numbers. The outside square 972 shows the extent of the eye-mounted display and the cross-hairs identify the horizontal and vertical directions for the eye-mounted display. The system receives information from the user about a relative rotation between the user's gaze and the calibration image. The system instructs, "Please say the two numbers closest to your selected horizontal reference." The user responds 430, "ten, thirteen." Based on the user's response, the system can determine 440 the approximate rotation of the eye-mounted display that aligns with the user's gaze 625. In this example, it does so by summing the two numbers. If the two numbers sum to 24, then the calibration image 979 and the user's gaze are approximately rotationally aligned. Smaller sums (23 in this example) mean the calibration image is rotated counter-clockwise relative to the user's gaze, and larger sums mean the calibration image is rotated clockwise relative to the user's gaze. As with FIG. 6, a series of calibration images of increasing resolution can be used to increase the accuracy of the calibration.

In FIG. 10, the calibration image 1079 is a set of parallel lines. The user is instructed, "Please rotate the parallel lines to align with your selected horizontal reference." The user responds, "Clockwise, clockwise, clockwise, stop," at which point the calibration image has been rotated sufficiently to align with the user's gaze.

As mentioned previously, the calibration preferably can be performed by the user himself without requiring the assistance of another person. The calibration can then be performed as necessary. For example, calibration might occur each time the user mounts the eye-mounted display on his eye. The user may also be able to request calibration. Then, if the user feels the eye-mounted display is misaligned, he can simply re-calibrate. The system may also detect certain conditions that trigger calibration.

Once calibration is completed, the calibration results can be stored as part of the user's profile for the eye-mounted display. In addition, calibration results over time can be recorded and analyzed.

Although the detailed description contains many specifics, these should not be construed as limiting the scope of the invention but merely as illustrating different examples. It should be appreciated that the scope of the disclosure includes other embodiments not discussed in detail above. For example, the technologies described are applicable to eye-mounted displays other than the specific types described above. Examples include displays in contact lenses other than scleral contact lenses, and also intraocular displays. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for a user to self-calibrate an orientation of an eye-mounted display relative to the user's gaze, where the user's gaze is a frame of reference of the user's perception of an external environment defined with respect to a field of view of the user's eye, the method implemented on a system and comprising:
   causing the eye-mounted display to project a calibration image onto a user's retina, where the eye-mounted display moves with the user's eye so that the calibration image is projected to a same location within the user's gaze as the user's eye moves;
   receiving information from the user about a relative orientation between the user's gaze and the calibration image within the user's gaze; and
   based on the information received from the user and independent of an external optical measurement of the user's eye, determining an adjusted orientation for the eye-mounted display that aligns images projected by the eye-mounted display with the user's gaze.

2. The method of claim 1 where receiving information from the user comprises receiving speech from the user about the relative orientation between the user's gaze and the calibration image.

3. The method of claim 1 where receiving information from the user comprises receiving information from the user via a non-voice input to the system.

4. The method of claim 1 further comprising:
   based on the determined adjusted orientation for the eye-mounted display, adjusting images projected by the eye-mounted display onto the user's retina.

5. The method of claim 1 where:
   receiving information from the user comprises receiving information from the user about a location of the user's gaze center on the calibration image; and
   determining the adjusted orientation of the eye-mounted display comprises, based on the received information, determining a location on the eye-mounted display that aligns with the user's gaze center.

6. The method of claim 5 further comprising:
   causing the user to gaze at a fixed external point while the calibration image is projected onto the user's retina.

7. The method of claim 5 where the location of the projected calibration image is stationary, and the information received from the user is about the location of the user's gaze center on the stationary calibration image.

8. The method of claim 7 where the calibration image is an array of symbols.

9. The method of claim 7 where the calibration image includes content that allows the user to verbally describe the location of the user's gaze center on the stationary calibration image.

10. The method of claim 5 where the location of the projected calibration image is moveable, and the information received from the user describes movement of the calibration image to align the user's gaze center and the calibration image.

11. The method of claim 10 where the calibration image has a marked center, and the information received from the user is about movement of the calibration image to align the user's gaze center with the marked center of the calibration image.

12. The method of claim 1 where:
   receiving information from the user comprises receiving information from the user about a relative rotation between the user's gaze and the calibration image; and
   determining the adjusted orientation of the eye-mounted display comprises, based on the received information, determining a rotation of the eye-mounted display that aligns with the user's gaze.

13. The method of claim 12 further comprising:
   causing the user to gaze at a fixed external line of known orientation while the calibration image is projected onto the user's retina.

14. The method of claim 12 where the location of the projected calibration image is stationary, and the information received from the user is about the relative rotation between the user's gaze and the calibration image.

15. The method of claim 12 where the location of the projected calibration image is moveable, and the information received from the user is about movement of the calibration image to rotationally align the user's gaze and the calibration image.

16. The method of claim 1 where the method is repeated at least two times using calibration images of increasing resolution.

17. The method of claim 1 where the method is performed automatically each time the user mounts the eye-mounted display on the user's eye.

18. The method of claim 1 where the method is performed in response to the user's request for calibration.

19. The method of claim 1 where the method is performed in response to the system automatically determining that the eye-mounted display requires calibration.

20. A non-transitory computer-readable storage medium storing executable program instructions for a user to self-calibrate an orientation of an eye-mounted display relative to the user's gaze, where the user's gaze is a frame of reference of the user's perception of an external environment defined with respect to a field of view of the user's eye, the instructions executable by a system and causing the system to perform a method comprising:
   causing the eye-mounted display to project a calibration image onto a user's retina, where the eye-mounted display moves with the user's eye so that the calibration image is projected to a same location within the user's gaze as the user's eye moves;

receiving information from the user about a relative orientation between the user's gaze and the calibration image within the user's gaze; and based on the information received from the user and independent of an external optical measurement of the user's eye, determining an adjusted orientation for the eye-mounted display that aligns images projected by the eye-mounted display with the user's gaze.

21. An auto-calibrating eye-mounted display system for a user to self-calibrate an orientation of an eye-mounted display relative to the user's gaze, where the user's gaze is a frame of reference of the user's perception of an external environment defined with respect to a field of view of the user's eye, the system comprising:

an eye-mounted display that projects images onto a user's retina; and a system in communication with the eye-mounted display, the system executing a method comprising:

causing the eye-mounted display to project a calibration image onto a user's retina, where the eye-mounted display moves with the user's eye so that the calibration image is projected to a same location within the user's gaze as the user's eye moves;

receiving information from the user about a relative orientation between the user's gaze and the calibration image within the user's gaze; and based on the information received from the user and independent of an external optical measurement of the user's eye, determining an adjusted orientation for the eye-mounted display that aligns images projected by the eye-mounted display with the user's gaze.

* * * * *